(12) United States Patent
Benisty et al.

(10) Patent No.: US 11,640,371 B2
(45) Date of Patent: May 2, 2023

(54) SNAPSHOT MANAGEMENT IN PARTITIONED STORAGE

(71) Applicant: Western Digital Technologies, Inc., San Jose, CA (US)

(72) Inventors: Shay Benisty, Beer Sheva (IL); Judah Gamliel Hahn, Ofra (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 226 days.

(21) Appl. No.: 16/817,264

(22) Filed: Mar. 12, 2020

(65) Prior Publication Data

US 2021/0286762 A1 Sep. 16, 2021

(51) Int. Cl.
| | |
|---|---|
| *G06F 16/11* | (2019.01) |
| *G06F 16/182* | (2019.01) |
| *G06F 12/02* | (2006.01) |
| *G06F 9/50* | (2006.01) |
| *G06F 9/30* | (2018.01) |
| *G06F 16/17* | (2019.01) |

(52) U.S. Cl.
CPC ........ *G06F 16/128* (2019.01); *G06F 9/30047* (2013.01); *G06F 9/5011* (2013.01); *G06F 12/0246* (2013.01); *G06F 16/1734* (2019.01); *G06F 16/182* (2019.01)

(58) Field of Classification Search
None
See application file for complete search history.

(56) References Cited

U.S. PATENT DOCUMENTS

| | | | |
|---|---|---|---|
| 8,046,547 B1* | 10/2011 | Chatterjee | G06F 11/1461 711/E12.003 |
| 8,375,002 B2 | 2/2013 | Anzai et al. | |
| 9,141,302 B2 | 9/2015 | Bennett | |
| 9,678,863 B2 | 6/2017 | Talagala et al. | |
| 10,037,339 B1 | 7/2018 | Kleinpeter et al. | |

(Continued)

OTHER PUBLICATIONS

Subramanian, Sriram, et al. "Snapshots in a Flash with ioSnap." Proceedings of the Ninth European Conference on Computer Systems. 2014. 14 pages. (Year: 2014).*

(Continued)

*Primary Examiner* — Uyen T Le
(74) *Attorney, Agent, or Firm* — Patterson + Sheridan, LLP; Steven H. VerSteeg

(57) ABSTRACT

The present disclosure generally relates to a storage snapshot management system. When updated data is written to the memory device, rather than rewriting all of the data, only the updated data is written to a new namespace. A snapshot of the new namespace indicates which LBAs in the new namespace contain data. New namespaces are added each time data is updated. When the updated data is to be read, the data storage device reads the updated LBA from the new namespace, and also gathers the non-updated data from the previous namespace. Eventually, the number of namespaces for the data reaches a threshold, and thus some namespaces need to be evicted. To evict a namespace, the updated data in the namespace is moved to a different namespace, or the non-updated data is moved to a namespace that contains updated data. In either case, the now unused namespaces are evicted.

14 Claims, 5 Drawing Sheets

(56) References Cited

U.S. PATENT DOCUMENTS

| | | | |
|---|---|---|---|
| 10,326,836 B2 | 6/2019 | Chawla et al. | |
| 10,860,427 B1* | 12/2020 | Chakraborty | G06F 11/1464 |
| 11,100,047 B2* | 8/2021 | Lv | G06F 16/128 |
| 11,157,173 B2* | 10/2021 | Frolikov | G06F 3/0688 |
| 2005/0216535 A1* | 9/2005 | Saika | G06F 11/1451 |
| 2007/0271431 A1* | 11/2007 | Hwang | G06F 11/1471 |
| | | | 711/162 |
| 2013/0054528 A1* | 2/2013 | Saika | G06F 3/067 |
| | | | 707/638 |
| 2013/0227236 A1* | 8/2013 | Flynn | G06F 3/061 |
| | | | 711/165 |
| 2014/0149698 A1* | 5/2014 | Ezra | G06F 12/0864 |
| | | | 711/162 |
| 2014/0372490 A1* | 12/2014 | Barrus | G06F 16/1873 |
| | | | 707/814 |
| 2015/0039577 A1* | 2/2015 | Talagala | G06F 3/0638 |
| | | | 707/703 |
| 2016/0246802 A1* | 8/2016 | Regni | G06F 16/20 |
| 2017/0344430 A1 | 11/2017 | Greer et al. | |
| 2018/0101477 A1* | 4/2018 | Kan | G06F 12/0246 |
| 2018/0150249 A1 | 5/2018 | Dewitt et al. | |
| 2019/0311047 A1* | 10/2019 | Guerra Delgado | G06F 16/188 |
| 2020/0065239 A1* | 2/2020 | Shayesteh | G06F 12/0253 |
| 2021/0042191 A1* | 2/2021 | Chauhan | G06F 11/1435 |
| 2021/0081284 A1* | 3/2021 | Watt | G06F 12/0246 |
| 2021/0081372 A1* | 3/2021 | Lee | G06F 16/284 |

OTHER PUBLICATIONS

Mager, Thomas, and Ernst Biersack. "DistBack: A low-overhead distributed back-up architecture with snapshot support." 2013 19th IEEE Workshop on Local & Metropolitan Area Networks (LANMAN). IEEE, 2013. 6 pages. (Year: 2013).*

Aggarwal, Charu C., et al. "On demand classification of datastreams." Proceedings of the tenth ACM SIGKDD international conference on Knowledge discovery and data mining. 2004. 6 pages. (Year: 2004).*

Shachar Fienblit (Jun. 13, 2014) Snapshot Done Right for All-Flash Storage Arrays. Kaminario. https://kaminario.com/company/blog/snapshot-done-right-flash-storage-arrays/ (7 pages).

* cited by examiner

SNAPSHOT MANAGEMENT IN PARTITIONED STORAGE

BACKGROUND OF THE DISCLOSURE

Field of the Disclosure

Embodiments of the present disclosure generally relate to managing a snapshot table in a data storage device.

Description of the Related Art

Storage snapshots are a core feature that any storage system is required to support. The term "snapshot" refers to temporarily storing a copy of a previous version of content stored in the data storage device. Storage snapshots are used extensively in a large variety of use cases and data centers, mainly for analytics, backup and restoring, and testing. When building a snapshot for an all flash memory array, there are four elements that should be kept in mind: cost, performance, ease of use, and flash endurance.

In regards to cost, a snapshot should be optimized to provision only the blocks that were changed and not perform inefficient cloning of an entire data set. The granularity of the data written to the storage device should be similar to the actual data written and not managed using large block sizes that require more space to preserve the snapshot data. The metadata used to track the changes should also be small and linear in size to the amount of changes made for the snapshot. When running in test and development or analytic environments, it is common that multiple copies of the same data set from different points in time are used simultaneously.

In regards to performance, a production environment with high performance requirements should not tolerate degradation just because snapshots are being used. In addition to the performance requirements of the production environment, other business processes are based on snapshots of the production environment. Typical use cases include real-time analytics, critical reports, and other data-mining processes.

An NVMe namespace is a quantity of non-volatile memory (NVM) that can be formatted into logical blocks. Namespaces are used when a storage virtual machine is configured with the NVMe standard. A namespace ID (NSID) is an identifier used by a controller to provide access to a namespace. When setting the NSID for a host or a host group, the accessibility of the namespace is also configured to a volume by a host. A logical block can only be mapped to a single host group at a time, and a given host group does not have any duplicate NSIDs.

Managing storage snapshots is a major challenge to storage management systems due to the strict requirements mentioned above. Some of the snapshot solutions are based on device inline deduplication capabilities. In such solutions, when a snapshot is created, the metadata is replicated, but the data is not. While such a solution is a nice shortcut for a quick snapshot development cycle, the solution introduces a limited snapshot solution that does not meet modern data center needs, and also leads to two snapshot characteristics.

Other solutions have created a native snapshot solution with data and metadata that are spaced efficient, distributed across all the system resources, and allocated only for the changed blocks. However, such a solution does not use the storage partition feature for leveraging snapshot management.

Therefore, there is a need in the art for a storage snapshot management system that leverages the storage partition feature.

SUMMARY OF THE DISCLOSURE

The present disclosure generally relates to a storage snapshot management system. When updated data is written to the memory device, rather than rewriting all of the data, only the updated data is written to a new namespace. A snapshot of the new namespace indicates which LBAs in the new namespace contain data. New namespaces are added each time data is updated. When the updated data is to be read, the data storage device reads the updated LBA from the new namespace, and also gathers the non-updated data from the previous namespace. Eventually, the number of namespaces for the data reaches a threshold, and thus some namespaces need to be evicted. To evict a namespace, the updated data in the namespace is moved to a different namespace, or the non-updated data is moved to a namespace that contains updated data. In either case, the now unused namespaces are evicted.

In one embodiment, a data storage device comprises: a memory device; and a controller coupled to the memory device, wherein the controller is configured to: receive a write command to a specific namespace; determine that the specific namespace is an update of a base version; allocate a memory block of the memory device; update a snapshot management table; and write data to the allocated block.

In another embodiment, a data storage device comprises: a memory device; and a controller coupled to the memory device, wherein the controller is configured to: receive a read command for a specific namespace ID (NSID); determine that the specific NSID is not a base version; read a snapshot management table of the specific NSID; and either: read data from the memory device; or decrease the specific NSID by one.

In another embodiment, a data storage device comprises: a memory device; and a controller coupled to the memory device, wherein the controller is configured to: receive an setting of a required snapshot number (RSN); receive a snapshot update delta (SUD); set a counter equal to 0; receive a version update for data; increase the counter by 1; and determine whether the counter exceeds RSN+SUD.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a storage snapshot management system. When updated data is written to the memory device, rather than rewriting all of the data, only the updated data is written to a new namespace. A snapshot of the new namespace indicates which LBAs in the new namespace contain data. New namespaces are added each time data is updated. When the updated data is to be read, the data storage device reads the updated LBA from the new namespace, and also gathers the non-updated data from the previous namespace. Eventually, the number of namespaces for the data reaches a threshold, and thus some namespaces need to be evicted. To evict a namespace, the updated data in the namespace is moved to a different namespace, or the non-updated data is moved to a namespace that contains updated data. In either case, the now unused namespaces are evicted.

Figure 1:
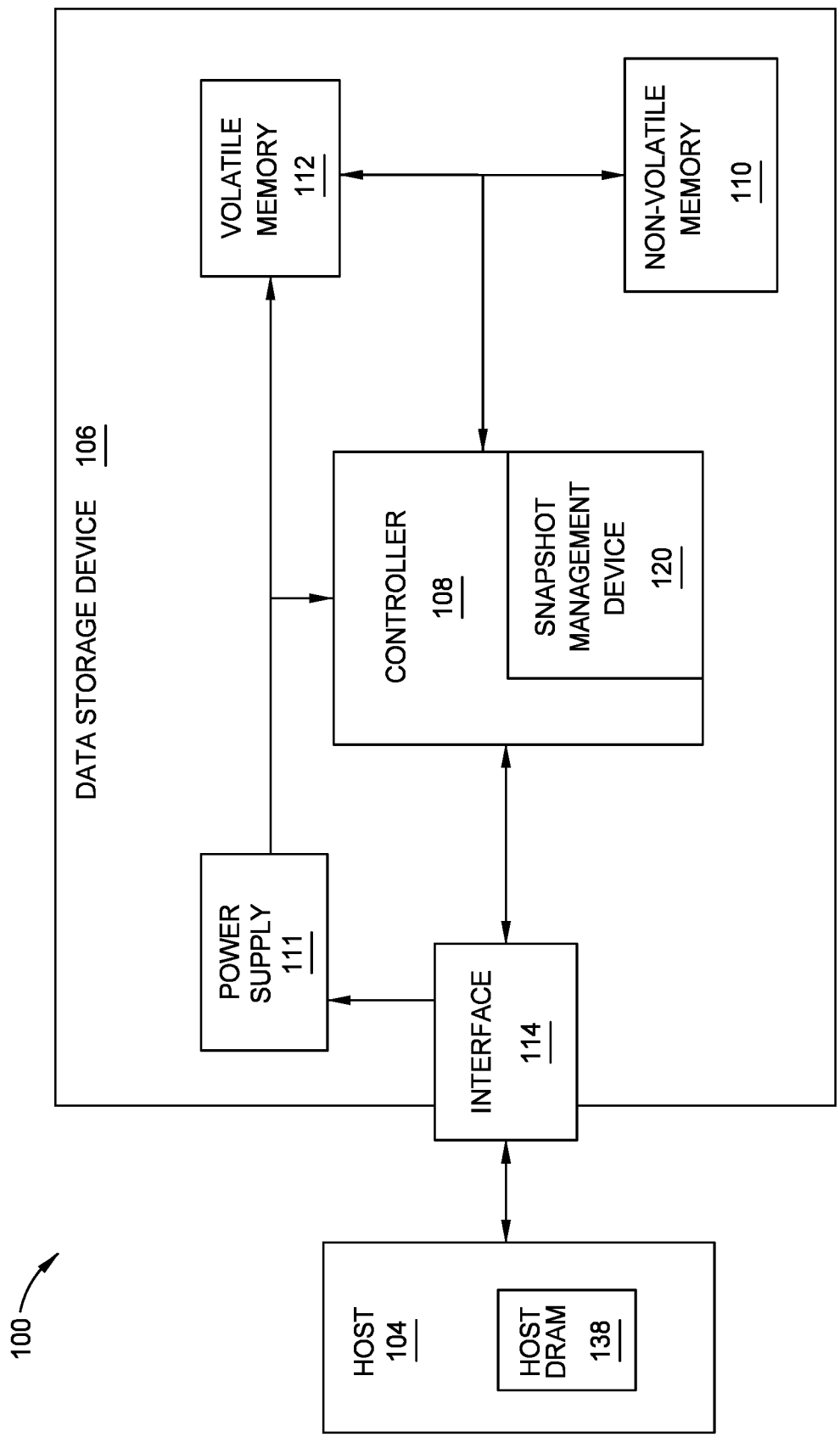
FIG. 1 is a schematic block diagram illustrating a storage system in which storage device may function as a storage device for a host device, in accordance with one or more techniques of this disclosure.

FIG. 1 is a schematic block diagram illustrating a storage system 100 in which a data storage device 106 may function as a storage device for a host device 104, in accordance with one or more techniques of this disclosure. For instance, the host device 104 may utilize non-volatile memory 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The data storage device 106 includes a controller 108, non-volatile memory 110 (NVM 110), a power supply 111, volatile memory 112, and an interface 114. The controller 108 comprises an internal memory or buffer (not shown). In some examples, the data storage device 106 may include additional components not shown in FIG. 1 for sake of clarity. For example, the data storage device 106 may include a printed board (PB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The data storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

Likewise, an NVMe namespace is a quantity of NVM 110 that can be formatted into logical blocks. Namespaces are used when a storage virtual machine is configured with an NVMe protocol. A namespace ID (NSID) is an identifier used by a controller 108 to provide access to an NVMe namespace. An NVMe namespace logical block can only be mapped to a single NVM location at a time. Furthermore, each NVM location does not have identical or duplicate NSIDs.

The data storage device 106 includes a power supply 111, which may provide power to one or more components of the data storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the data storage device 106 receives a write command from the host device 104, the controller 108 temporarily stores the data associated with the write command in the internal memory before sending the data to the NVM 110.

The controller 108 is coupled with a snapshot management device 120 which is a hardware and/or firmware designed to handle storage snapshot. Storage snapshot is a core-feature that any storage system is required to support. Storage snapshot refers to temporarily storing a copy of previous versions of the content stored in the storage. The storage snapshot is a logical table that stores the address of the physical location of the data. The storage snapshot table may be a logical block address (LBA) table.

Figure 2:
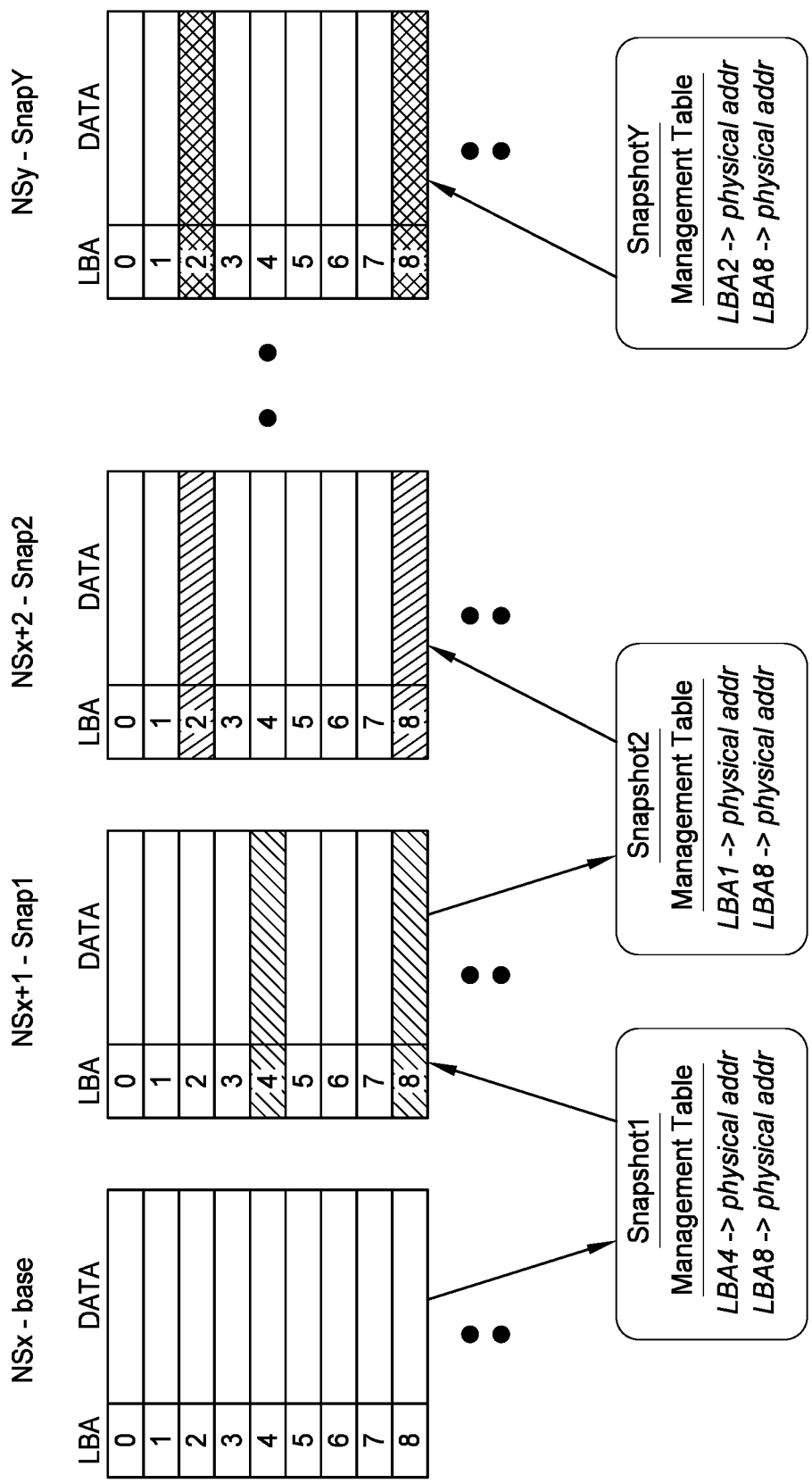
FIG. 2 is a schematic illustration of snapshot management according to one embodiment.

FIG. 2 is a schematic illustration of snapshot management according to one embodiment. The namespace ID (NSID) is an identifier used by a controller, such as controller 108 coupled with a snapshot management device 120 of FIG. 1, to provide access to an NVMe namespace. When data is written to a physical location in the NVM, such as NVM 110 of FIG. 1, the location of the data is stored in a logical location in a table in the snapshot management device 120. The table in the snapshot management device 120 may be a LBA table or a snapshot management table. The snapshot management table may comprise of "n" number of LBAs, so that LBAn corresponds with a last LBA in the table. The variable "n" denotes that an unspecified number of LBAs may exist in a single NSID location or a single snapshot management table. Each entry in the snapshot management table has an ID, such as a snapshot-ID, associated with the physical location of the data that matches the partition-ID. While updates are written to the NVM 110, the partition-ID and the snapshot-ID are updated with the relevant information. The non-update sections in the snapshot management table are stored at a single physical location in the NVM. Furthermore, the non-update sections can be accessed through any namespace.

The NSx is the namespace-ID "x" where "NSx" represents the base version of the file. Each LBA in the NSx is initialized by the data storage device, such as the data storage device 106 of FIG. 1, and is comprised of the "BASE" version. The "BASE" version is data located in an initial snapshot0 management table. The snapshot management table is configured for each version of the snapshot in which updates are made to a new snapshot management table. For example, the initial snapshot management table is NSx, while a first update to the NSx occurs in the NSx+1 location. The NSx+1 location is the NSID for the first update or "snapshot" of the file. The "+1" indicates a first update, which a "+2" indicates a second update, and so-forth. Snapshot # management table corresponds to the updated table so that the snapshot1 management table corresponds with NSx+1 location.

When updated data is written to the NSx+1 location, the physical location or physical block address (PBA) is stored in the snapshot1 management table of the NVM 110. However, only the modified LBAs are stored in the snapshot management table relevant to the updated location. For example, LBA4 and LBA8 are updated in the NSx+1 location. The snapshot1 management table records the physical address of the updated LBAs, LBA4 and LBA8. Likewise, when LBA1 and LBA8 are updated in NSx+2 location, the snapshot2 management table records the physical address of the updated LBAs, LBA1 and LBA8.

Furthermore, when accessing LBA data in the NSx+2 location, previous NSID locations may be accessed. The snapshot # management tables associated with the previous NSID locations will be utilized. For example, to read LBA1 through LBA4 of NSx+2 location, the previous NSIDs locations are accessed since NSx+2 does not contain the LBA data for LBA2, LBA3, or LBA4. The previous snapshot management tables will be utilized to locate the physical address of the LBA data. The snapshot management device, such as the snapshot management device 120 of FIG. 1, utilizes logic controls to access the current LBA data. The NSx+1, NSx+2, and so-forth locations in the NAND contain only the modified LBAs, while the NSx location contains the "BASE" data. If referencing an NSID location for a particular LBA and the data is not located in that location, then the previous NSID locations are searched for the LBA until the referenced LBA is located in one of the previous NSID locations or the "BASE" NSID location, NSx.

In addition, since NSx+2 contains data for LBA1, but not LBA2, LBA3, or LBA4, the previous NSID locations are accessed sequentially going backwards. For example, the NSx+1 is the previous location for data. LBA4 is located in NSx+1 and the LBA data is read from that location. The remaining LBAs to be read are LBA2 and LBA3. The next previous NSID location is NSx, which is the "BASE" version of the NSID location. The "BASE" location comprises the first data of the NSID array. The term "first data" refers to the data in NSx or the "BASE" location and is not necessarily referencing the original data. Since the previous NSID location is NSx, the base data is read for LBA2 and LBA3. When the snapshot management device 120 detects that the relevant LBA is not modified in the current snapshot (i.e., the LBA does not exist in the current NSID location), the previous snapshot is checked.

Figure 3:
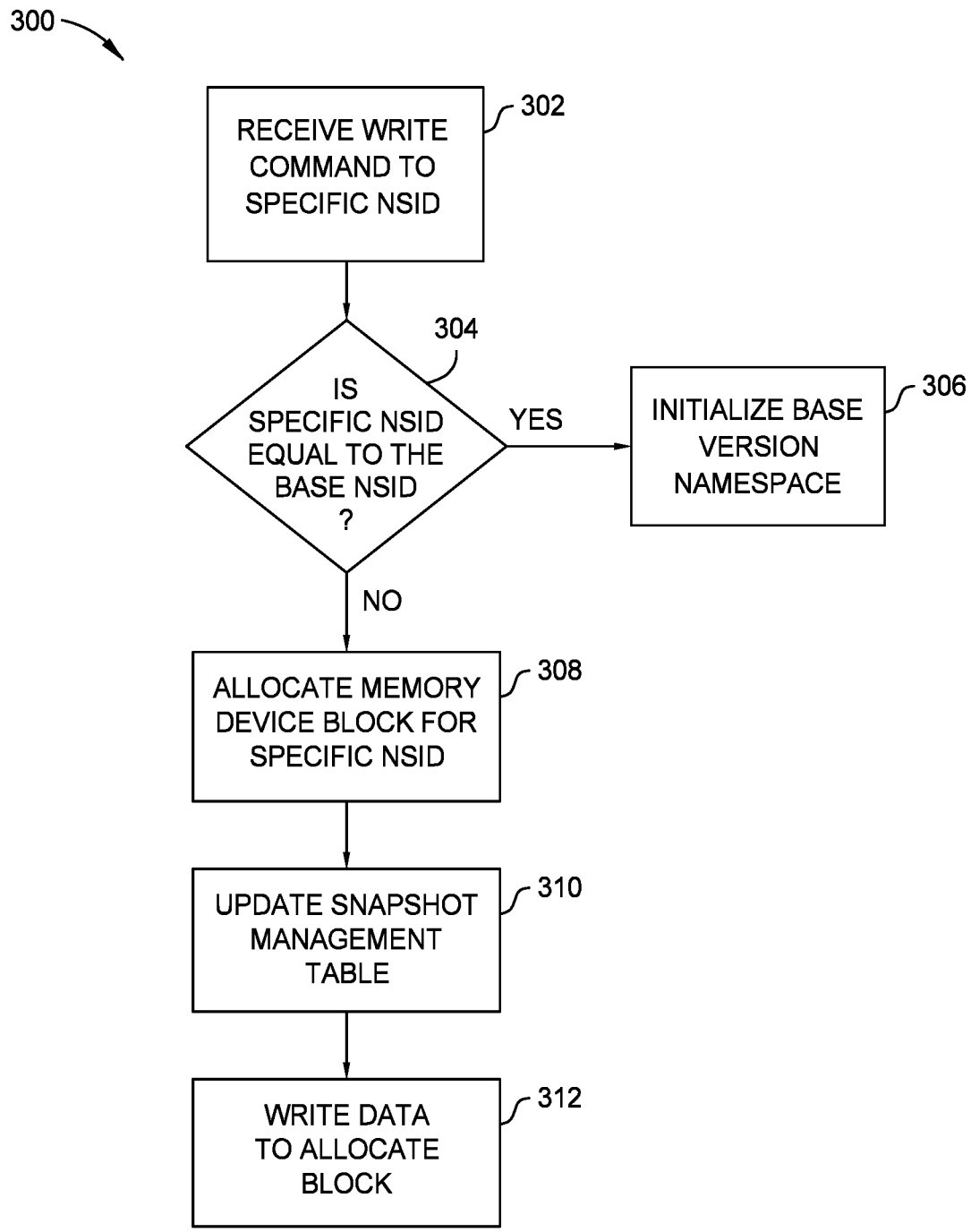
FIG. 3 is a flowchart illustrating a method of writing data to the data storage device according to one embodiment.

FIG. 3 is a flowchart illustrating a method 300 of writing data to the data storage device according to one embodiment. The controller, such as the controller 108 of FIG. 1, receives a write command from the host, such as the host device 104 of FIG. 1, for a specific NSID at block 302. The controller 108 utilizes a snapshot management device, such as the snapshot management device 120 of FIG. 1, to determine if the NSID associated with the write command is the base NSID at block 304. If the NSID associated with the write command is the base NSID, then the base version of the NSID, such as NSx of FIG. 2, is initialized using the write data from the command at block 306.

However, if the NSID associated with the write command is not equal to the base NSID version at block 306, then the snapshot management device 120 allocates an available NAND block for the write command at block 308. When the NSID associated with the write command does not match the base NSID version, the controller 108 registers that the data is an update and the base NSID version, NSx, should not be initialized. The relevant snapshot management table, such as the snapshot1 management table of FIG. 2, is updated with the location of the overridden LBAs at block 310 and the modified LBAs are written to the appropriated NAND block at block 312.

For example, one or more write commands are received by the controller 108 at block 302. The one or more write commands are associated with a third NSID location, NSx+2. The controller determines that the one or more write commands associated with the NSx+2 location is not the same as the NSx "BASE" location at block 304. Because the NSID locations are not the same, the controller allocates a memory device block for the NSx+2 location at block 308. The snapshot management device 120 updates the snapshot management table with the current location of NSx+2 LBAs associated with the one or more write commands at block 310. The one or more write commands associated with a third NSID location, NSx+2, are written to the allocated memory device block at block 312.

In another example, one or more write commands are received by the controller 108 at block 302. The one or more write commands are associated with a first NSID location, NSx. The controller determines that the one or more write commands associated with the NSx location is the same as the base NSID location at block 304. Because the NSID locations are the same, the base version namespace is initialized at block 306.

Figure 4:
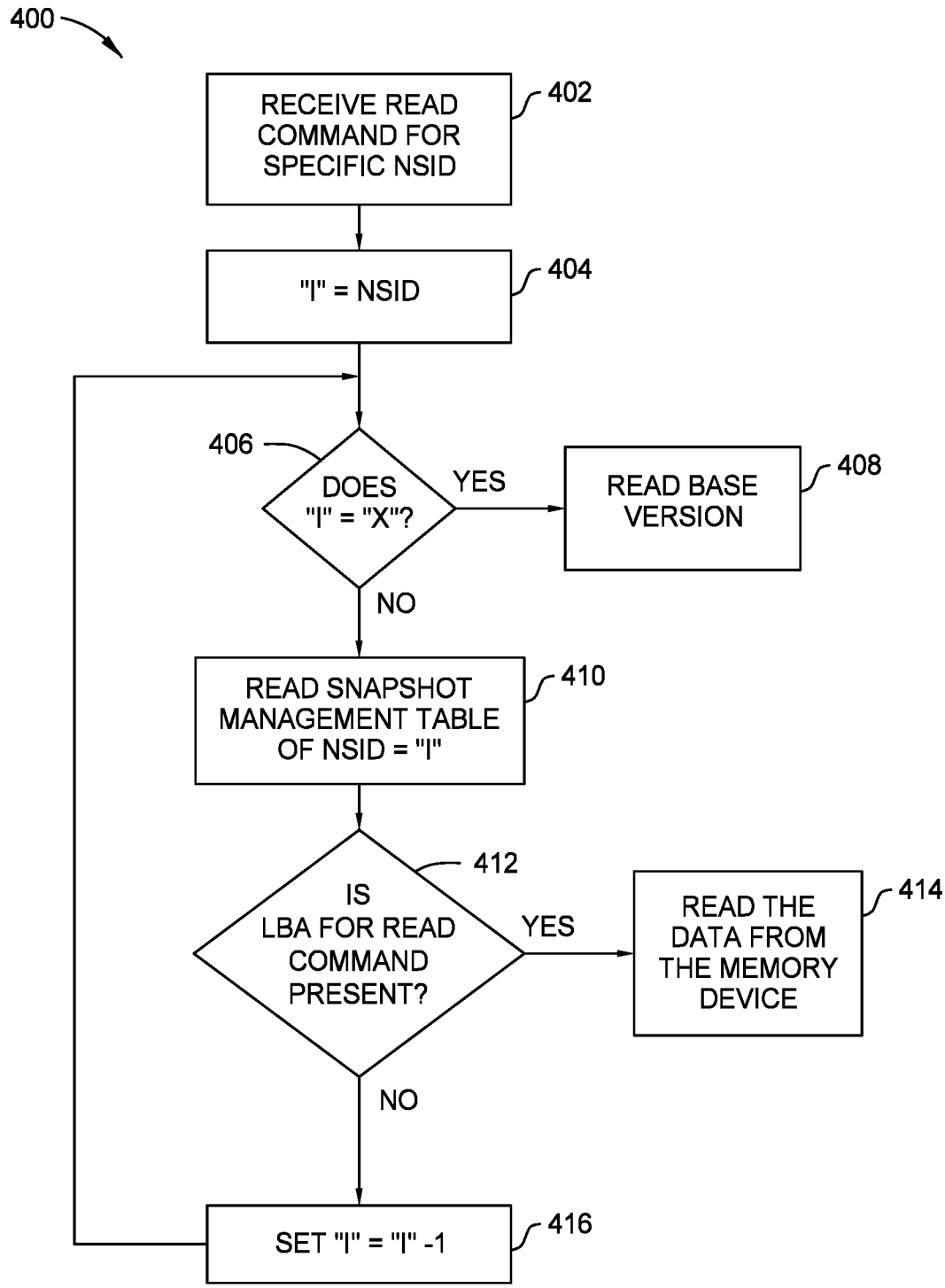
FIG. 4 is a flowchart illustrating a method of reading data from the data storage device according to one embodiment.

FIG. 4 is a flowchart illustrating a method 400 of reading data from the data storage device according to one embodiment. A controller, such as the controller 108 of FIG. 1, receives one or more read commands for one or more LBAs in a specific NSID location at block 402. The controller 108 logic sets the specific NSID location to a variable "I" at block 404. The controller 108 may utilize a snapshot management device, such as the snapshot management device 120 of FIG. 1, to determine the location of the LBAs within each NSID location. If "I" equals "X" at block 406, where "X" equals the base NSID location, NSx, then the base version, NSx, is read at block 408.

If "I" does not equal "x" at block 406, then the snapshot management table of the snapshot management device 120 associated with the NSID location "I" is read for the relevant LBA at block 410. If the LBA is present in the current NSID location "I", then the data is read from the memory device from the current NSID location "I" at block 414. However, if the LBA is not present in the current NSID location "I", then the controller 108 logic sets "I" (new) equal to "I" (previous)−1 so that the previous snapshot management table of the NSID is read at block 416.

After setting "I" (new) equal to "I" (previous)−1, the controller 108 determines if the "I" (new) is equal to "X", where "X" is the base NSID location, NSx, at block 406. The process including reading the base version at block 408, reading the data from the memory device at block 414, or setting "I" (new)="I" (previous)−1 occurs until either the base version is read or the LBA is present in the current "I" location and is read from the current "I" location in the memory device.

For example, one or more read commands for one or more LBAs associated with a first NSID location, NSx, are received by the controller 108 at block 402. The controller 108 logic sets the relevant NSID location to "I" at block 406. Because "I" equals "X", where "X" equals the base NSID version, NSx, at block 406, the base version, NSx, is read at block 408.

In another example, one or more read commands for one or more LBAs associated with a third NSID location, NSx+2, are received by the controller 108 at block 402. The controller 108 logic sets the relevant NSID location to "I" at block 406. The controller 108 logic also sets the base NSID version, NSx, to "X". Because "I" does not equal X" at block 406, then the snapshot management table of the snapshot management device 120 associated with the NSID location "I" is read at block 410. The LBAs present in the NSx+2 location are LBA3 and LBA6. The one or more read commands are for LBA1, LBA4, and LBA6 of the third NSID location, NSx+2. Because LBA6 is present in the current NSID location at block 412, the data is read from the memory device at 414.

However, because LBA4 is not present in the current NSID location at block 412, then the controller 108 sets "I" (new)="I" (previous)-1 at block 416. The new "I" is the second NSID location, NSx+1. Because "I" does not equal X" at block 406, then the snapshot management table of the snapshot management device 120 associated with the NSID location "I" is read at block 410. The LBAs present in the NSx+1 location are LBA2, LBA4, and LBA6. The remaining one or more read commands are for LBA1 and LBA4 of the third NSID location, NSx+2. Because LBA4 is present in the current NSID location, NSx+1, at block 412, the data is read from the memory device at block 414. Though LBA6 is present in the current NSID location, the currently updated LBA6 has already been read from the NSx+2 location.

However, because LBA1 is not present in the current NSID location at block 412, then the controller 108 sets "I" (new)="I" (previous)-1 at block 416. The new "I" is the first NSID location, NSx. Because "I" equals X" at block 406, then the base version NSx of the snapshot management table of the snapshot management device 120 is read at block 408. The base NSID version contains all the base LBAs (i.e., contains LBA0-LBAn) of the snapshot management table. The remaining one or more read commands are for LBA1 of the third NSID location, NSx+2. LBA6 is read from the third NSID location, NSx+2, LBA4 is read from the second NSID location, NSx+1, and LBA1 is read form the first NSID location, NSx.

Figure 5:
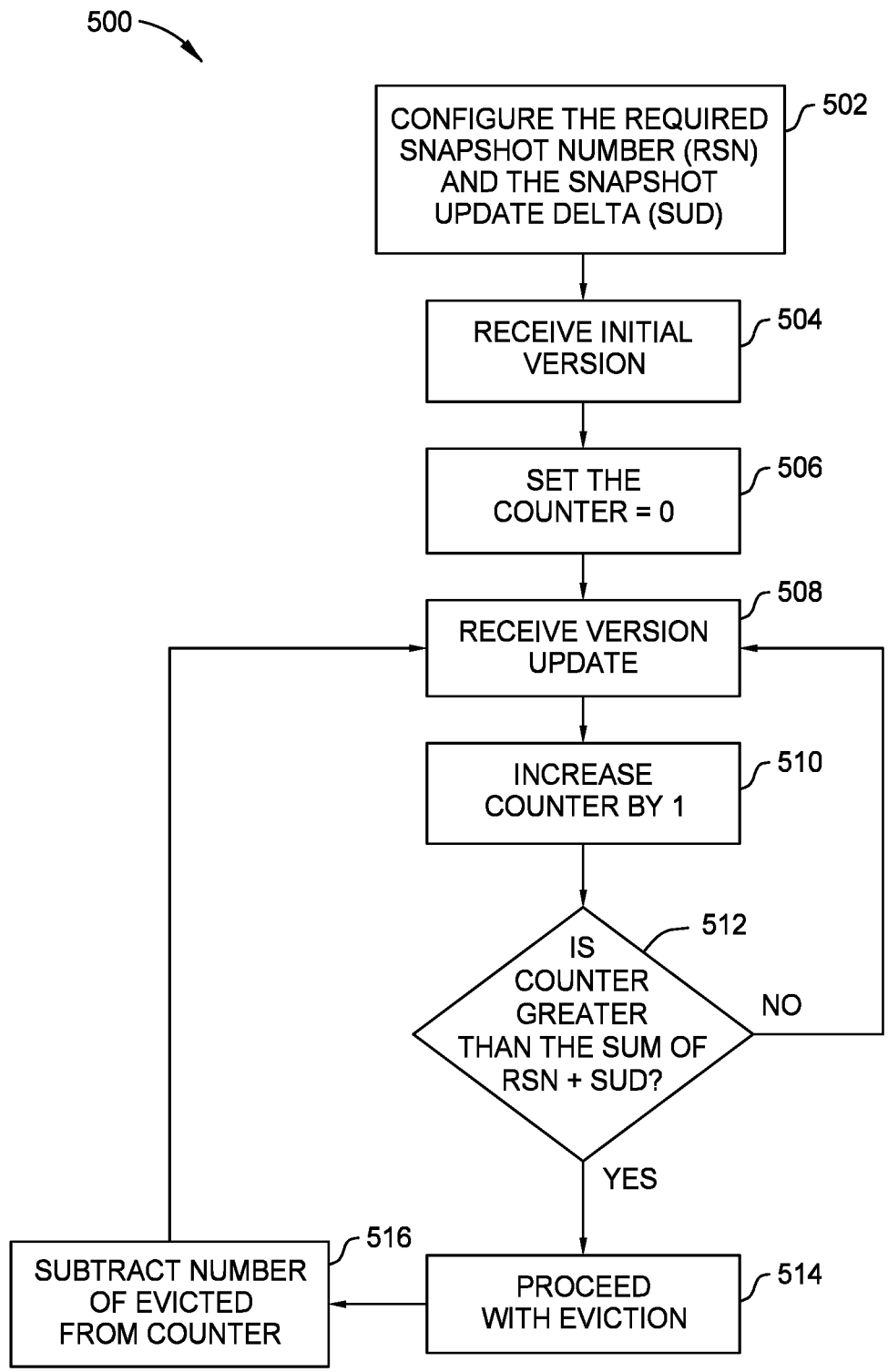
FIG. 5 is a flowchart illustrating a method of evicting a namespace according to one embodiment.

FIG. 5 is a flowchart illustrating a method 500 of evicting a namespace according to one embodiment. The controller, such as the controller 108 of FIG. 1, may utilize firmware and/or hardware such as a snapshot management device, which may be the snapshot management device 120 of FIG. 1, to manage the different snapshot management tables. The maximum number of supported versions of previous snapshots or namespaces in a snapshot management device 120 may be about 15. The maximum number of supported versions of previous snapshots or namespaces listed is not intended to be limiting, but to provide an example of a possible embodiment. In another embodiment, the maximum number of supported versions of previous snapshot management tables may be flexible and set adaptively based on historical statistics of usage of previous versions for various applications and for various users.

For example, the sum of the snapshots or namespaces, NSx to NSx+14, in the snapshot management device is 15. When a new write command associated with a sixteenth NSID location, NSx+15, is received, the snapshot management device evicts a snapshot or a namespace from the snapshot management device. The evicted snapshot may be the first snapshot or the first namespace in the array or the last snapshot in the array. If the first snapshot or the first namespace associated with the NSx base version in the array is evicted, the relevant data is written to the second snapshot in the array. However, if a modified LBA exists in the second snapshot or the second namespace, the LBA from the first snapshot or the first namespace is not written to the second snapshot or the second namespace. For example, each snapshot or namespace table comprises of a possible eight LBA locations, LBA0 to LBA7, and the second snapshot or the second namespace comprises of modified LBAs, LBA0 and LBA7. When the first snapshot or the first snapshot is evicted, only LBA1 through LBA 6 are written to the second snapshot or the second namespace. The second snapshot or the second namespace is renamed to be the first snapshot or the first namespace and is associated with the NSx base version. The new write command associated with a sixteenth NSID location, NSx+15, is written to an allocated block corresponding to the NSx+14 location. In another embodiment, the relevant data is not written to the second snapshot; rather, the pointers in the management tables are updated to point to the original data (i.e., there is no need to copy the relevant data if the pointers are updated).

If the last snapshot or the last namespace associated with the NSx+14 location in the array is evicted, the relevant data is written to the previous snapshot or previous namespace, NSx+13, in the array. The modified LBAs in the NSx+14 location is written to corresponding position in the NSx+13 location. For example, each snapshot table comprises of a possible eight LBA locations, LBA0 to LBA7, and the last snapshot or the last namespace, NSx+14, comprises of modified LBAs, LBA0 and LBA7, and the previous snapshot or the previous namespace, NSx+13, comprises of a modified LBA, LBA0. When the last snapshot or the last namespace is evicted, modified LBAs, LBA0 and LBA7, associated with the last snapshot or the last namespace, NSx+14, are written to the previous snapshot or the previous namespace, NSx+13. The modified LBA, LBA0 that previously existed in NSx+13 is overwritten by the more current modified LBA, LBA0 of the last snapshot or the last namespace, NSx+14. The new write command associated with a sixteenth NSID location, NSx+15, is written to an allocated block corresponding to the NSx+14 location.

The snapshot management device 120 may comprise of logic to set a minimum and maximum number of supported previous versions of snapshots or namespaces associated with the eviction process. Furthermore, one or more snapshots or one or more namespaces may be evicted concurrently. The predetermined number to evict at the same time may be five snapshots or five namespaces. The number of snapshots or namespaces evicted concurrently listed is not intended to be limiting, but to provide an example of a possible embodiment. The minimum number of supported previous versions of snapshots or namespaces is denoted as "RSN". The snapshot or namespace update delta is denoted as "SUD" and is the predetermined number of snapshots or namespaces to be evicted concurrently. By adding the "RSN" and "SUD" together, the maximum number of supported previous versions of snapshots or namespaces can be calculated. For example, if "RSN" equals 10 and "SUD" equals 5, then the maximum number of supported previous versions of snapshots or namespaces is 15.

The method 500 describes the snapshot or namespace eviction process previously described. The controller 108 configures the snapshot management device 120 to have a required snapshot number (RSN) and a snapshot update delta (SUD) at block 502. The snapshot management device 120 receives an initial snapshot or an initial namespace at block 504 and is written to the relevant memory device block. The initial snapshot or the initial namespace is the base NSID version or the NSx. The snapshot management device 120 may comprise of a counter to determine the total number of snapshots or namespaces associated with the snapshot management device 120. The snapshot management device 120 sets the counter equal to 0 at block 506.

The snapshot management device 120 receives a version update associated with one or more LBAs and appropriates the relevant memory device block at block 508. The counter is increased by 1 at block 510 each time a version update is received at block 508. The snapshot management device 120 determines if the counter is greater than the sum of "RSN" and "SUD" at block 512. If the counter is less than the sum of "RSN" and "SUD" at block 512, the snapshot management devices waits until a version update is received at block 508. If the counter is more than the sum of "RSN" and "SUD" at block 512, then the eviction process previously described will proceed at block 514. The eviction may affect a predetermined number of snapshots or namespaces. The number of snapshots or namespaces evicted is subtracted from the counter at block 516 and the snapshot management device 120 waits until a version update is received at block 508.

In one example, "RSN" is equal to 10 and "SUD" is equal to 5, so that sum of "RSN" and "SUD" is 15. The snapshot management device 120 is configured with the required numbers associated with "RSN" and "SUD" at block 502. The snapshot management device 120 receives an initial version associated with the base NSID version, NSx, at block 504. The snapshot management device 120 counter is set to 0 at block 506. An update version associated with modified LBAs is received by the snapshot management device 120 at block 508. The modified LBAs associated with the current update version are written to an appropriated NSID location, NSx+1. The counter associated with the snapshot management device 120 is increased by 1 at block 510. Since the counter is 1 and is less than the sum of "RSN" and "SUD", which is 15, at block 512, the snapshot management device 120 waits until another version update is received at block 508.

When the counter equals 16 and is larger than the sum of "RSN" and "SUD", which is 15, at block 512, the eviction process proceeds at block 514. Since "SUD" is 5, five namespaces or five snapshots are evicted from the snapshot management table. The five namespaces or five snapshots may be from the beginning of the snapshot array or the end of the snapshot array. The relevant snapshot or namespace locations are updated with the relevant LBA positions from the evicted namespace or snapshot locations. The "SUD" is subtracted from the counter at block 516. The counter is now at 11. The snapshot management device 120 waits to receive a version update at block 508. When the snapshot or namespace locations are evicted, the array is adjusted by the number of snapshot or namespaces locations evicted, so that NSx+1 may previously be NSx+6, NSx may previously be NSx+5, and so-forth.

By implementing a snapshot management system as described herein, data storage device performance and endurance is significantly increased due to the redirect on write snapshot implementation as compared to copy-on write snapshots. Furthermore, the snapshots are created extremely fast which improves performance. Additionally, efficient scale-out implementation is possible because the scale-out spreads and balances both the data and the snapshot metadata across all the nodes and the memory devices. Finally, the solution is based on the well-defined namespace feature in the NVMe standard, which leads to a robust and reliable solution.

In one embodiment, a data storage device comprises: a memory device; and a controller coupled to the memory device, wherein the controller is configured to: receive a write command to a specific namespace; determine that the specific namespace is an update of a base version; allocate a memory block of the memory device; update a snapshot management table; and write data to the allocated block. The controller includes a snapshot management device. The snapshot management device allocates the memory block, updates the snapshot management table, and writes the data to the allocated block. The data that is written to the allocated block is modified LBAs. Base data that is not changed remains in a different namespace. The controller is further configured to, upon determining that the specific namespace is an update of the base version, not initialize the base version. The controller is further configured to write non-updated data to a different namespace during a namespace eviction process. The controller is further configured to update pointers in the snapshot management table to point to the base version.

In another embodiment, a data storage device comprises: a memory device; and a controller coupled to the memory device, wherein the controller is configured to: receive a read command for a specific namespace ID (NSID); determine that the specific NSID is not a base version; read a snapshot management table of the specific NSID; and either: read data from the memory device; or decrease the specific NSID by one. The controller is further configured to: decrease the specific NSID by one; determine that the specific NSID is not a base version; read a snapshot management table of the specific NSID; and either: read data from the memory device; or decrease the specific NSID by one. The controller is further configured to read data from the memory device, wherein the reading comprises reading updated data from a first namespace and a second namespace. The controller is further configured to: determine that the specific namespace is an update of a base version; allocate a memory block of the memory device; update a snapshot management table; and write data to the allocated block. The controller is further configured to evict one or more namespaces once a number of namespaces exceeds a threshold. The evicting comprises moving data to a different namespace and releasing the evicted namespace. The snapshot management table contains information regarding specific updated LBAs for a specific namespace.

In another embodiment, a data storage device comprises: a memory device; and a controller coupled to the memory device, wherein the controller is configured to: receive an setting of a required snapshot number (RSN); receive a snapshot update delta (SUD); set a counter equal to 0; receive a version update for data; increase the counter by 1; and determine whether the counter exceeds RSN+SUD. The controller is further configured to evict one or more snapshots if the counter exceeds RSN+SUD. The controller is further configured to, after evicting one or more snapshots, repeat the receiving a version update for data, increasing the counter by 1, and determining whether the counter exceeds RSN+SUD. The controller is further configured to reduce the counter by 1 after evicting a snapshot. The controller is further configured to, after determining that the counter exceeds RSN+SUD, repeat the receiving a version update for data, increasing the counter by 1, and determining whether the counter exceeds RSN+SUD. The controller is configured to set a new base version for SUD.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a write command to program data to a specific namespace ID (NSID);
determine that the write command is associated with an update to a base snapshot version, wherein logical block addresses (LBAs) of the base snapshot version are stored in a first snapshot of a snapshot management table;
allocate a memory block of the memory device;
update a second snapshot of the snapshot management table, wherein the second snapshot consists of updated LBAs corresponding to the update;
write the data associated with the write command to the allocated block;
determine whether a total number of snapshots associated with the specific NSID exceeds a threshold number of snapshots; and
evict a predetermined number of consecutive snapshots concurrently in a snapshot eviction process when the total number of snapshots associated with the specific NSID exceeds the threshold number of snapshots, wherein the evicting occurs to either a beginning of a snapshot array comprising the total number of snapshots or an end of the snapshot array.

2. The data storage device of claim 1, wherein the controller includes a snapshot management device.

3. The data storage device of claim 2, wherein the snapshot management device allocates the memory block, updates the snapshot management table, and writes the data associated with the write command to the allocated block.

4. The data storage device of claim 1, wherein the data that is written to the allocated block is associated with the updated LBAs of the second snapshot.

5. The data storage device of claim 4, wherein base data that is not changed remains in a previous snapshot version.

6. The data storage device of claim 1, wherein the controller is further configured to, upon determining that the write command is associated with the update to the base snapshot version, not initialize the base snapshot version.

7. The data storage device of claim 1, wherein the controller is further configured to write one or more LBAs associated with an evicted snapshot to an adjacent snapshot during the snapshot eviction process, wherein the adjacent snapshot is sequential to the evicted snapshot, and wherein the adjacent snapshot is not evicted.

8. The data storage device of claim 1, wherein the controller is further configured to update pointers in the snapshot management table to point to the base snapshot version.

9. The data storage device of claim 1, wherein each snapshot of the snapshot management table contains information regarding one or more updated LBAs for each version of the specific NSID.

10. A data storage device, comprising:
a memory device; and
a controller coupled to the memory device, wherein the controller is configured to:
receive a setting of a required snapshot number (RSN) for a namespace, wherein the required RSN is a minimum number of supported previous versions of snapshots for the namespace;
receive a snapshot update delta (SUD), wherein the SUD is a number of snapshot versions of the namespace to be evicted concurrently during a snapshot version eviction process;
set a counter equal to 0;
receive data associated with the namespace;
update a most recently updated snapshot version for the received data associated with the namespace;
increase the counter by 1 when the most recently updated snapshot version is updated;
determine whether the counter exceeds RSN+SUD; and
evict one or more consecutive snapshot versions, based on the SUD, when the counter exceeds RSN+SUD, wherein the evicting occurs to either a beginning of a snapshot array comprising each snapshot version of the namespace or an end of the snapshot array.

11. The data storage device of claim 10, wherein the one or more snapshot versions are evicted starting either from:
a base snapshot version of the namespace, wherein the base snapshot version is a first snapshot version of the namespace; or
the most recently updated snapshot version of the namespace, wherein the most recently updated snapshot version is a last snapshot version of the namespace.

12. The data storage device of claim 11, wherein the controller is further configured to, after evicting the one or more snapshot versions, repeat the receiving a version update for data, increasing the counter by 1, and determining whether the counter exceeds RSN+SUD.

13. The data storage device of claim 10, wherein the controller is further configured to, after determining that the counter does not exceed RSN+SUD, repeat the receiving a version update for data, increasing the counter by 1, and determining whether the counter exceeds RSN+SUD.

14. The data storage device of claim 10, wherein the controller is configured to set a new base snapshot version for the namespace after the one or more snapshot versions has been evicted from the namespace, and wherein the new base snapshot version is associated with a least recent update of the namespace.

* * * * *